United States Patent [19]
Hendrickson

[11] 3,747,987
[45] July 24, 1973

[54] HYDRAULIC POWER BRAKE BOOSTER ACTUATED TRAILER BRAKE SYSTEM

[75] Inventor: Richard T. Hendrickson, South Bend, Ind.

[73] Assignee: The Bendix Corporation, South Bend, Ind.

[22] Filed: Feb. 10, 1972

[21] Appl. No.: 225,160

[52] U.S. Cl.......................... 303/7, 303/10, 188/3 R
[51] Int. Cl............................................. B60t 13/00
[58] Field of Search.................... 303/7, 10; 188/3 R

[56] References Cited
UNITED STATES PATENTS
2,177,469 10/1939 White ...................................... 303/7
2,387,942 10/1945 Price ...................................... 303/7

Primary Examiner—Allen N. Knowles
Attorney—Ken C. Decker et al.

[57] ABSTRACT

A hydraulic brake system for a towing vehicle and a trailer. The towing vehicle brakes are operated by a hydraulic power boost device having a chamber connected to a pump via valve means, the latter of which controls the chamber pressure which acts on one end of a piston which is drivably connected to the vehicle master cylinder piston. A hydraulic slave actuator is connected in hydraulic communication with the chamber and includes a pressure responsive plunger drivably connected to the trailer master cylinder piston for operating the trailer brakes.

9 Claims, 3 Drawing Figures

Patented July 24, 1973 3,747,987

HYDRAULIC POWER BRAKE BOOSTER ACTUATED TRAILER BRAKE SYSTEM

BACKGROUND OF THE INVENTION

This invention relates to a hydraulic brake system for a towing vehicle and a trailer and utilizes a hydraulic power brake booster on the towing vehicle for braking both vehicle and trailer.

It is common practice in the trailer industry to employ surge type brakes for controlling hydraulic brake actuation on most house trailers and socalled recreational trailers for hauling boats, campers, etc. Examples of trailer brake actuators of the surge type are to be found in U.S. Pat. Nos. 3,342,292, 3,077,248 and 2,625,243. Such surge type brake actuators not only tend to erratic braking of the trailer under varying conditions of operation but also present a brake release problem when backing the trailer. Other types of brakes for trailers, including pneumatic and electric brakes, have also been used but not without inherent problems of their own, such as might be encountered by a driver unfamiliar with the eccentricities of trailer braking at high speeds, in a turn, etc. This is especially true in the absence of some form of coordinated timing and balancing of the braking action between the vehicle and the trailer.

Although hydraulic brakes for trailers are desirable, the present practice of hydraulically connecting the trailer brake system with the brake system of the towing vehicle has the disadvantage of increasing the fluid displacement from the brake system of the towing vehicle, thus causing excessive travel of the pedal which is operatively connected to the towing vehicle's master cylinder piston. Under severe braking conditions this can result in complete loss of pedal, i.e., pushing the pedal to the floor.

This invention is proposed, as a solution to most of the difficulties aforementioned by employing a hydraulic power boost device having adequate fluid supply, completely eliminating the brake release problem when backing the trailer, and otherwise coordinating vehicle braking with trailer braking in the proper proportions.

SUMMARY OF THE INVENTION

A principal object of the present invention is the provision of an improved hydraulic brake system for trailer brakes, actuation of which is performed by a hydraulic power booster.

Another object of the invention is the provision of a hydraulic brake system for a trailer wherein trailer brake actuation is achieved through a foot pedal operated hydraulic power booster operatively connected to the towing vehicle brakes and to the trailer brakes for concurrent braking.

A still further object of the invention resides in the provision of a hydraulic brake system for a towing vehicle and a trailer in which a hydraulic power booster is mounted on the towing vehicle and operatively connected to the brakes of the towing vehicle and to a hydraulic slave actuator, the latter of which is mechanically linked to a master cylinder for applying the trailer brakes.

Yet another object of the invention is the provision of a hydraulic brake system for a towing vehicle and a trailer, and wherein a hydrauulic power booster which is operatively connected to the towing vehicle brakes is also hydraulically connected to the brakes of the trailer via a master cylinder mounted to the trailer and a slave actuator mounted to the vehicle, said actuator being drivably connected to said master cylinder through a detachable link to allow for separation between the towing vehicle and the trailer.

The above and other important objects and features of the invention will be apparent from the following description of the brake system taken in connection with the accompanying drawings.

Figure 1:
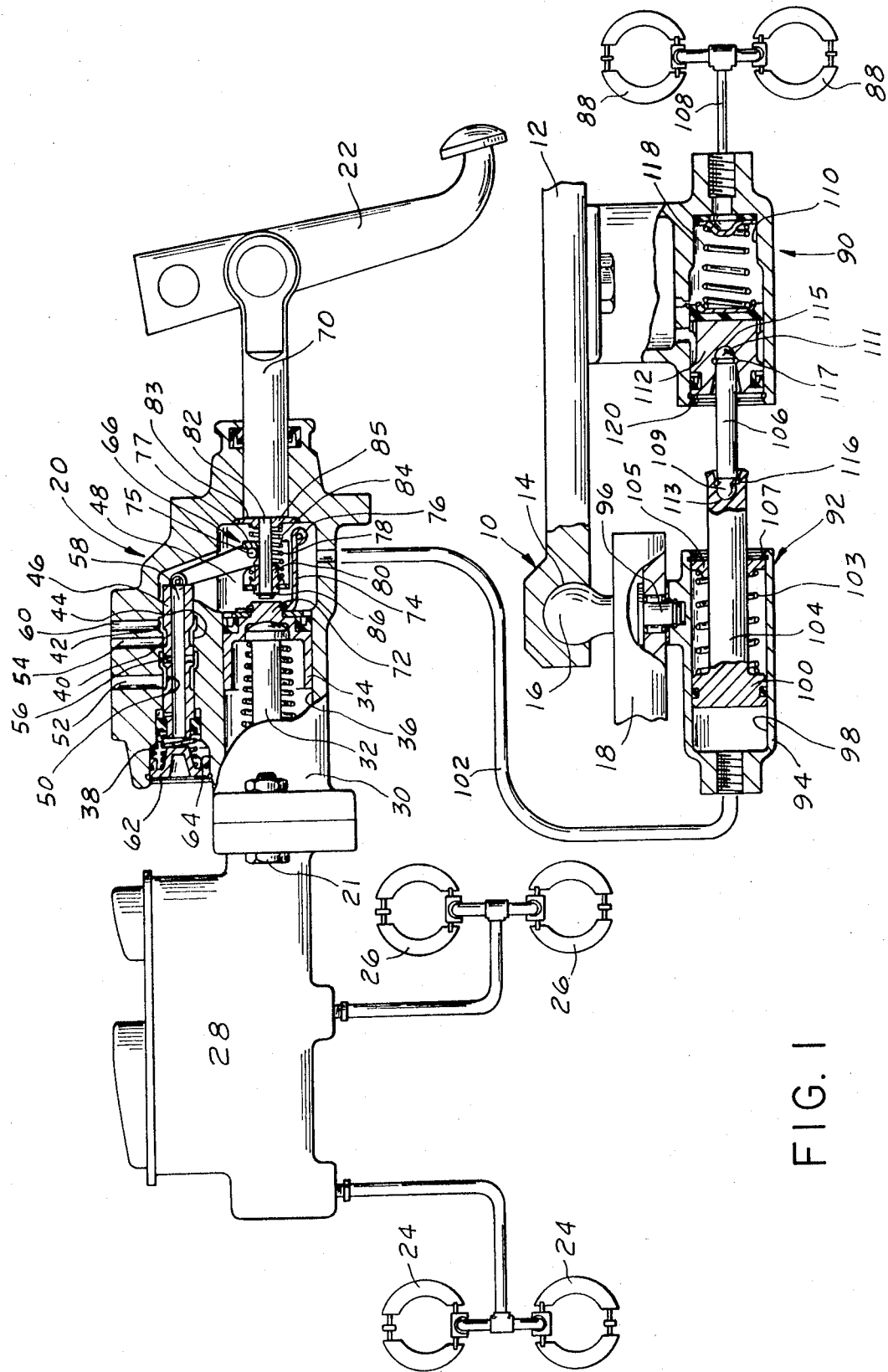
FIG. 1 is a diagrammatic representation of the brake system of my invention illustrating certain of the system components in section in order to show the operating parts.

Referring to the drawing, particularly to FIG. 1 thereof, there is shown the hydraulic brake system of my invention in association with a towing vehicle and a trailer coupled together by a hitch 10, including a trailer tongue 12 formed with a socket 14, the latter of which fits over a ball member 16 which is mounted to the towing vehicle structure 18. This type of ball and socket hitch is of standard design, providing for no overrun of the trailer with respect to the towing vehicle during braking. However, the ball and socket hitch allows misalignment or angular motion in the horizontal plane between the vehicle and trailer so that a turn can be freely negotiated.

As shown in FIG. 1, the hydraulic brake system of the towing vehicle and trailer is actuated by a hydraulic power boost device 20 mounted in an appropriate section of the vehicle to permit operation of pedal 22 by the vehicle operator. The power boost device 20 is operatively connected to front brakes 24 and rear brakes 26 of the vehicle through a split system master cylinder 28 mounted to housing 30 of the boost device 20 by bolts 21. A force transmitting push rod 32 drivably connects a piston 34 of the device to the master cylinder 28 in a manner well known to those skilled in the art. The piston 34 is reciprocally positioned in a bore 36 of the housing 30 and is coaxial with the bore of the split system master cylinder 28. A second bore 38 is formed in the upper portion of the housing 30 with grooves 40 and 42 therein. A land 44 is located between these grooves 40 and 42. A spool valve 46 is slidably carried within the bore 38 for controlling fluid communication to a pressure chamber 48. The spool valve 46 is provided with grooves 50 and 51 which communicate respectively with an exhaust port 52 and a hydraulic pressure port 54. The groove 40 communicates with the pressure chamber 48 via radial passages 56 and a longitudinal passage 58 of the spool valve 46. The groove 42 of the bore 38 is in communication with a port 60 which is connected to other hydraulically operated devices such as the steering gear of the towing vehicle. A plug 62 sealingly closes one end of the bore 38 in which the valve spool slides. A spring 64 is interposed between the plug 62 and the end of the valve spool contiguous the plug to thereby urge the spool against levers 66, only one of which is shown, which form an operative part of control means or valve actuating mechanism 68. The control means 68 is interconnected between the piston 34, the valve spool 46, and push rod 70, the latter of which is connected to the foot pedal 22. The end of the piston 34 exposed to the pressure chamber 48 is formed with a boss 72 for fixedly mounting a bracket 74 on which the levers 66 are pivotally attached at 76. Driving the shaft 70 to the left by depressing brake pedal 22 rotates the levers 66 counterclockwise about their pivot 76 by engagement between pins 75 carried on the levers 66 and laterally extending flanges 77 on U-shaped bracket 78. The U-shaped bracket 78 is carried on a collar 80 which is slidably received on the small diameter end 82 of the push rod 70. A spring 84 is caged or preloaded between the collar 80 and bearing means 83 which abuts the large diameter end 85 of the push rod 70. The collar 80 is located at the small end 82 of the push rod 70 by a snap ring 86. Under normal braking conditions, when actuating the valve spool 46 by depressing pedal 22, the preload of the spring 84 is such that it acts as a solid connection between the push rod 70 and the U-shaped bracket 78. However, in the event of a malfunction of the power boost device, the spring 84 will collapse, permitting the push rod 82 to slide through the collar 80 into driving engagement with the end of the piston 34 for manual operation. Details of the construction and operation of the power boost device 20 are more completely disclosed in U.S. Pat. No. 3,603,209, assigned to the assignee of the present invention and incorporated herein by reference.

Figure 2:
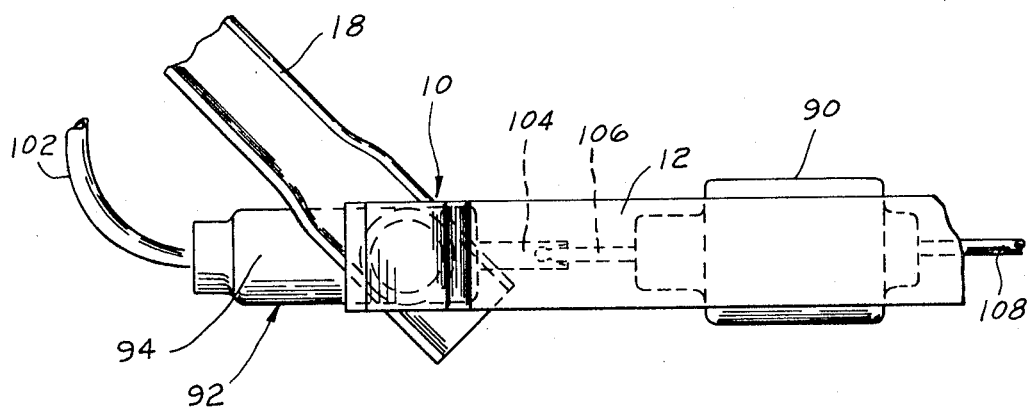
FIG. 2 is a top plan view of the vehicle and trailer hitch of FIG. 1 showing the relationship of parts of the slave actuator and trailer master cylinder when the towing vehicle is making a turn.

The boost device 20 is also operatively connected to the trailer brakes 88 through a trailer master cylinder 90 attached to the trailer structure 12 and a hydraulic slave actuator 92. The slave actuator 92, as shown in FIG. 1, comprises a housing 94 mounted on the vehicle structure 18 by bearing means 96 located along the axis of the hitch 10 so that the actuator 92 and master cylinder 90 will maintain alignment during a turning maneuver by the towing vehicle as shown in FIG. 2. That is, pivotally suspending the slave actuator housing 94 to the vehicle by bearing means 96 allows for misalignment between the vehicle and trailer in the horizontal plane as might occur when the towing vehicle and trailer enter a turn. The housing 94 is provided with a longitudinal bore 98 in which a piston 100 is reciprocally positioned. One end of the bore 98 is connected to the pressure chamber 48 of the boost device by a flexible hose or conduit 102. The flexibility of the conduit allows for the changing horizontal angular relationship between the vehicle and trailer. The piston 100 is equipped with a shaft 104 which extends beyond the other end of the housing bore 98 for drivably connecting the slave actuator 92 to push rod 106 of the trailer master cylinder 90. A spring 103, interposed between the piston 100 and a bearing member 105 held in the actuator housing by retainer ring 107, urges the piston toward the left end of the bore 98, as viewed in FIG. 1. The master cylinder 90 is of the single system type, having a single line 108 which communicates bore 110 with the trailer brakes 88. The push rod 106 is formed with opposed rounded or spherical end portions 109 and 111 which ride in sockets 113 and 115 of the shaft 104 and master cylinder piston 112, respectively. Retainer rings 116 and 117 are located in the sockets 113 and 115 to releasably retain the push rod 106 in driving relationship to the shaft 104 and the master cylinder piston 112. A spring 118 is positioned in the master cylinder bore 110 so as to urge piston 112 and push rod 106 to the left, as viewed in FIG. 1. Movement of the piston 112 to the left under the influence of the spring 118 is restricted by retainer ring 120 mounted in the open end of the bore 110. The ability of the master cylinder 90 to displace fluid upon movement of the piston 112 to the right is well known in the hydraulic brake art. It is to be observed that after disconnecting the hitch 10 which joins the towing vehicle to the trailer, the brake system of the trailer is uncoupled from the brake system of the towing vehicle simply by with-drawing the push rod 106 from the socket 113 of the actuator shaft. This arrangement provides a mechanical coupling between the brake systems of the towing vehicle and the trailer, eliminating the likelihood of derogating the trailer brake system through loss of hydraulic fluid.

Figure 3:
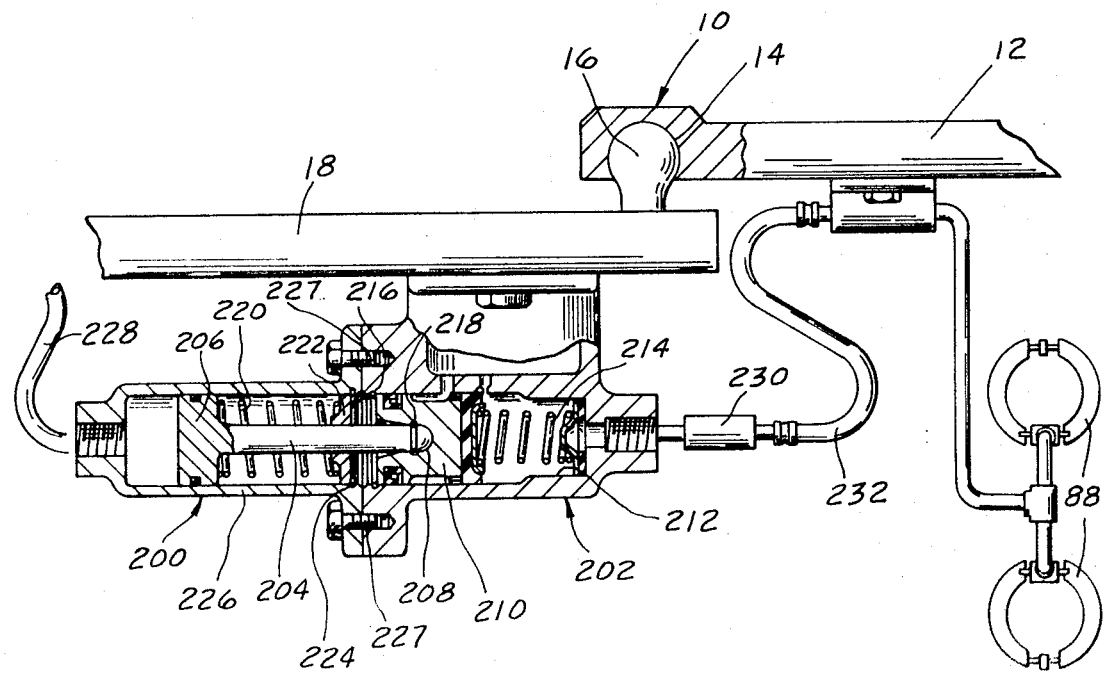
FIG. 3 is a diagrammatic illustration of a modified form of arrangement of actuator and trailer master cylinder.

As to the modified brake system of FIG. 3, the braking function of the system is the same as that of the system shown in FIG. 1. The principal difference in the systems resides in the location of the slave actuator and its associated trailer master cylinder which dictates design changes to these components. The arrangement of the components of FIG. 3 contemplates mounting the actuator 200 and the trailer master cylinder 202 on the towing vehicle, preferably in the engine compartment for accessibility. With this arrangement, the components 200 and 202 are fixedly mounted to the vehicle structure 18 and the shaft 204 of the slave actuator piston 206 is carried in a socket 208 of master cylinder piston 210 which is reciprocally located in bore 212 of the master cylinder 202. A spring 214 urges the master cylinder piston 210 against a retainer ring 216, thereby determining the master cylinder piston location in the bore 212 with respect to the actuator piston 206 and shaft 204. The shaft 204 is releasably held in the socket 208 by retainer ring 218. A spring 220 is interposed between the piston 206 and a bearing member 222 for urging the piston to the left as viewed in FIG. 3. A retainer ring 224 is secured in the open end of actuator housing 226 to provide a stop for the end bearing member 222. The housing 226 is attached to the master cylinder 202 by studs 227. A hydraulic connection 228 communicates the slave actuator 200 with the pressure chamber 48 of the hydraulic power boost device 20. A hydraulic coupling 230, of standard design and well known in the art, is located in hydraulic line 232 which connects the trailer master cylinder 202 to the trailer brakes 88. The coupling 230 is disconnected when it is desired to uncouple the towing vehicle from the trailer.

MODE OF OPERATION

With the spool valve 46 of the power device 20 in the position shown in FIG. 1, fluid under pressure enters port 54 and exits through port 60 via the overlapping grooves 51 and 42 located respectively, in the spool valve 46 and bore 38. Pressure chamber 48 is communicated to the exhaust or return port 52 through longitudinal passage 58, radial passages 56, and overlapping grooves 40 and 50. Depressing the brake pedal 22 rotates the levers 66 about the pivot 76 thereby causing the spool valve 46 to slide to the left, as viewed in FIG. 1, so that fluid under pressure is admitted to groove 40 which is now in communication with the pressure port 54 via groove 51. Also, groove 40 is now cut off from groove 50 which communicates with the exhaust port 52. The pressure build up in the groove 40 is transferred to the pressure chamber 48 through passages 56 and 58 in the spool valve. Since one end of the piston 34 is exposed to the fluid pressure in chamber 48 and the slave actuator is likewise exposed to the chamber pressure, the power boost device is operatively connected hydraulically to the vehicle brake system and the trailer brake system. Accordingly, a pressure build up in the chamber 48 acts in both brake systems concurrently so as to operate the vehicle and trailer brakes simultaneously. However, it is to be noted that the hydraulic fluid for operating the trailer brakes is taken from the chamber 48, and not from the split system master cylinder 28 of the vehicle, to insure that an adequate supply of hydraulic fluid is available for braking, thus eliminating brake pedal loss and reducing the hazard of inefficient braking due to excessive fluid displacement from the split system master cylinder. Also, the brake system herein disclosed enables the operator of the towing vehicle to have complete control of the brakes on both the vehicle and the trailer whether moving forward or in reverse.

I claim:

1. A hydraulic brake system for a towing vehicle and a trailer hitched thereto, which comprises:
    a hydraulic power boost device mounted to the towing vehicle and adapted to be connected to a hydraulic pressure source and to the vehicle brakes;
    said device having a pressure chamber and control means including valve means for regulating hydraulic pressure to said chamber for braking said vehicle;
    a hydraulic slave actuator having a piston slidably positioned therein;
    a hydraulic connection from the actuator to said pressure chamber for communicating chamber pressure to said actuator to drive said piston; and
    a master cylinder for the trailer brakes including a piston drivably connected to said actuator piston;
    said actuator being pivotally carried to the vehicle at the hitch point between the towing vehicle and the trailer so that misalignment therebetween in a horizontal plane can occur in turning;
    said master cylinder including a push rod detachably secured between said master cylinder piston and said actuator piston so that said vehicle and trailer may be separated.

2. A hydraulic brake system, as recited in claim 1, wherein said control means includes a foot pedal and lever means operatively connected to said valve means.

3. A hydraulic brake system, as recited in claim 1, in which said actuator and said trailer master cylinder are adapted to be mounted respectively, to the vehicle and to the trailer;
    said hydraulic connection comprising a flexible hose.

4. In a hydraulic brake system for a trailer adapted to be hitched to a towing vehicle, which vehicle includes a hydraulic brake system of its own having therein a pedal-operated hydraulic power brake booster operatively connected hydraulically to both of said systems to control their respective brakes, the improvement which comprises:
    a hydraulic slave actuator in the trailer brake system connected in hydraulic communication with said booster; and
    a master cylinder in said trailer brake system having a force transmitting member connected to said slave actuator;
    said actuator including a housing and a piston slidable therein;
    said actuator piston and said housing together forming a chamber in said housing with which said booster is hydraulically connected so that the pressure acting in said booster in response to pedal movement to apply the vehicle brakes also acts to apply the trailer brakes concurrently;
    a bearing support member pivotally mounting said actuator housing to said vehicle along the axis of the hitch connecting the vehicle and trailer.

5. The improvement in claim 4, wherein said trailer master cylinder is mounted to said trailer; said force transmitting member connecting said actuator to said trailer master cylinder includes a swivel joint which permits vertical misalignment between vehicle and trailer.

6. The improvement in claim 5 wherein said swivel joint is separable so as to permit disconnecting the vehicle and trailer at said hitch.

7. In a hydraulic brake system for a towing vehicle and a towed vehicle hitched thereto, said towed vehicle having hydraulically actuated brakes:
    means for effecting a brake application, said means including a housing defining a pressure chamber therewithin, valve means for controlling fluid communication into said pressure chamber, and means operated by the vehicle operator to actuate said valve means to communicate fluid pressure into said pressure chamber when a brake application is effected;
    a first hydraulic actuator mounted on said towing vehicle, said first actuator including a housing defining a bore therewithin, and a piston slidably mounted in said bore and cooperating with one end of the latter to define a fluid compartment therebetween;
    means communicating said compartment with said pressure chamber, whereby said compartment is pressurized whenever fluid pressure is developed is said pressure chamber;
    a second hydraulic actuator mounted on said towed vehicle, said second actuator including a housing defining a bore therewithin and a piston slidable in said bore and cooperating with one end of the latter to define a fluid cavity therebetween;
    means communicating said cavity with the hydraulic actuators on the brakes of the towed vehicle, whereby a trailer brake actuator is effectd when the fluid content of said cavity is pressureized; and
    mechanical linkage means interconnecting the piston in the first actuator with the piston in the second actuator.

8. The invention of claim 7; and
    means pivotally mounting one of said actuators to the corresponding vehicle to permit actuation the one theOactuator with respect to said corresponding vehicle about a generally vertical axis.

9. The invention of claim 7:
    said mechanical linkage means including a push rod;
    means retaining one end of said push rod to the piston in said first actuator; and
    means retaining the opposite end of said push rod to the piston in said second actuator.

* * * * *